United States Patent [19]

Brinkley et al.

[11] 4,077,422

[45] Mar. 7, 1978

[54] FLOW CONTROL MEANS FOR COMPRESSED GAS CYLINDERS

[75] Inventors: Robie G. Brinkley, 708 S. Main St., Morton, Ill. 61550; Gerry D. Welton, Peoria, both of Ill.

[73] Assignee: said Robie G. Brinkley by said Gerry D. Welton

[21] Appl. No.: 632,282

[22] Filed: Nov. 17, 1975

[51] Int. Cl.² ................ F17C 13/12; F16K 17/30
[52] U.S. Cl. ............................................. 137/68 R
[58] Field of Search ................................. 137/68 R

[56] References Cited

U.S. PATENT DOCUMENTS

| | | | |
|---|---|---|---|
| 2,945,503 | 7/1960 | Atkinson | 137/68 R |
| 3,618,626 | 11/1971 | Russo | 137/68 R |
| 3,645,286 | 2/1972 | Follett | 137/68 R |
| 3,648,893 | 3/1972 | Whiting | 137/68 R X |

Primary Examiner—Alan Cohan
Assistant Examiner—Gerald A. Michalsky
Attorney, Agent, or Firm—Hill, Gross, Simpson, Van Santen, Steadman, Chiara & Simpson

[57] ABSTRACT

A fail-safe shutoff device used in conjunction with a high-pressure control valve for compressed gas cylinders which will immediately check uncontrolled gas flow from the cylinder generally associated with a damaged or defective control valve. The shutoff device includes a valve means placed in series flow communication with the control valve and is pre-set to an open position and held open by balanced forces applied to opposite ends of the shutoff valve means. In this counterpoise condition, the valve means is subjected to the pressure of the compressed gas stored in the cylinder and is made responsive to a substantial imbalance of these forces, brought about by a damaged control valve to block escape of the compressed gas in the cylinder.

12 Claims, 13 Drawing Figures

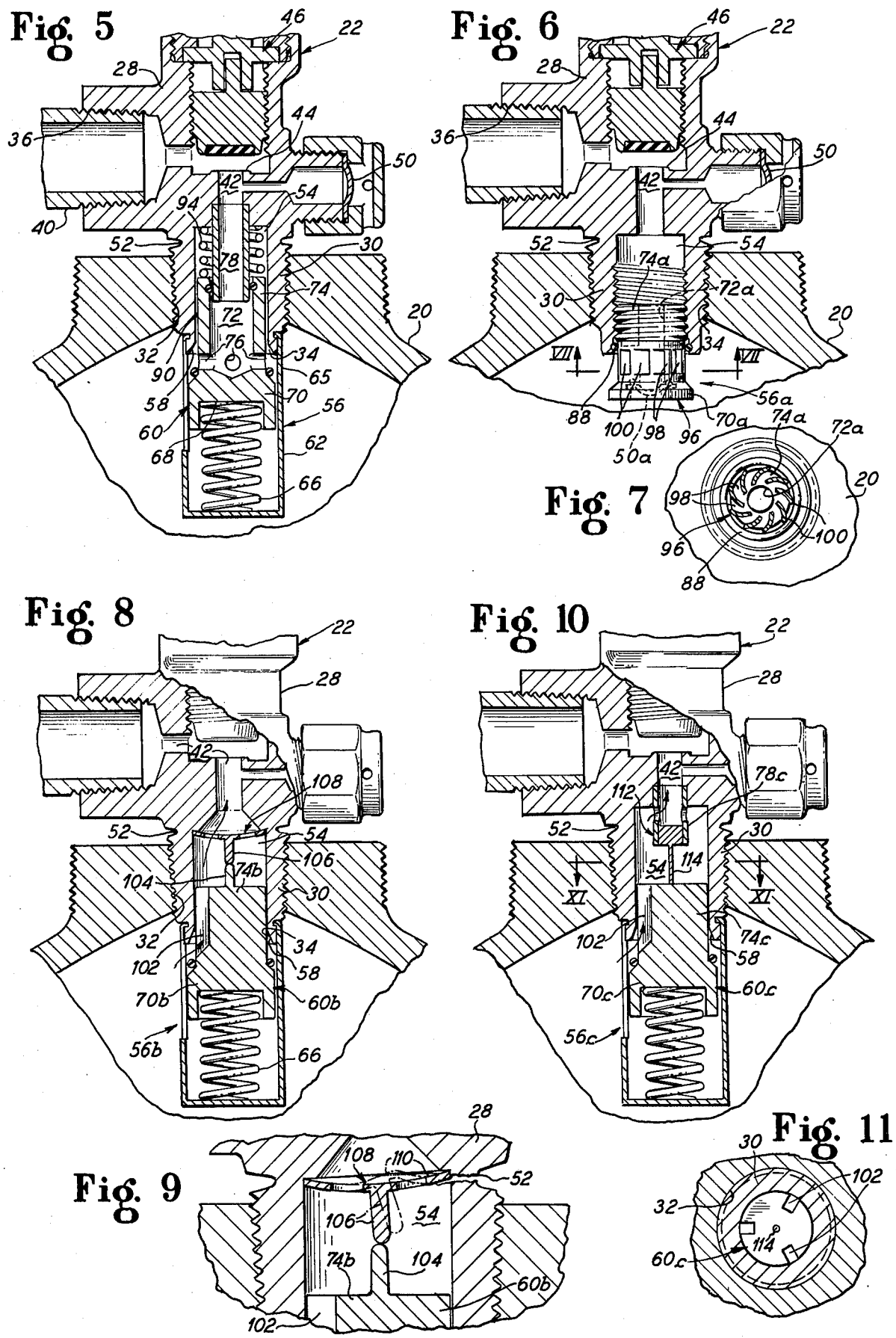

FLOW CONTROL MEANS FOR COMPRESSED GAS CYLINDERS

BACKGROUND OF THE INVENTION

It has long been recognized that compressed gas cylinders, used widely today in industry, construction, repair service facilities and hospitals, represent a hazard to life and property with numerous safety codes and regulations governing their storage, transportation, and use. Unchecked gas flow from a highly pressurized cylinder can turn the cylinder into a deadly destructive projectile, as well as suddenly release a large volume of gas into the ambient air which may be of a hazardous character in itself.

Good safety practices require cylinders containing combustible compressed gases to be stored in "out" buildings or in areas remote from populated sites to minimize their danger and that compressed gas cylinders be chained down while being transported, both on a delivery truck and on a shop dolly during use. This is to minimize the possibilities of upset and damage to the cylinders and their highpressure control valves. Further, when the cylinders are not in use, a valve-protector-cap is attached to the cylinder, over the control valve to guard against damage thereto. However, when the cylinders are placed in use, the protector-cap must be removed to gain access to the control valve for connecting the usual pressure regulator valves or to make other operative connections thereto.

The compressed gas cylinders are usually made of drawn steel without seams and are carefully heat-trusted so as to develop great strength and toughness. Further, frangible disks are incorporated into the high-pressure control valves to relieve overpressurization generally associated with compressed gas cylinders exposed to elevated temperatures. This does not, however, afford any protection against a sudden "blow-out" of gas due to a damaged control valve.

In the event the high-pressure control valve is damaged, as for example by a fork lift truck maneuvering too close to a gas cylinder, or an over-head crane moving material in the vicinity of a cylinder; or even by an upset or dropping of the cylinder, the top portion of the cylinder may be sheared away or severely cracked so that a jet stream of escaping gas from the broken control valve transforms the cylinder into a flying missile.

Since the control valve is the "weakest link" of the compressed gas cylinder assembly, great care must be exercised to prevent damage thereto while the gas cylinder is being used. However, carelessness or unavoidable accidents can cause damage to the control valve with disastrous consequences.

SUMMARY OF THE INVENTION

The present invention provides a fail-safe shutoff device utilized in conjunction with a high-pressure control valve for compressed gas cylinders which is adapted to quickly check uncontrolled gas leakage associated with a damaged or sheared-off control valve. The shutoff device, which is incorporated into the valve body intake end of the control valve and arranged in series flow communication therewith, is preset to a full open position. With the gas cylinder charged, the shutoff device is unaffected by the normal working flow of gas passing therethrough. In this open condition, a valve spool of the shutoff device is maintained in a counterpoise state by generally balanced forces brought to bear against opposing ends of the valve spool. These balanced forces are in part attributable to the compressed gas in the cylinder and in part to various other force-inducing means utilized in consistency with the objectives of the several embodiments of this invention.

The valve spool is arranged to respond to a predetermined imbalance of the forces acting on the opposing spool ends, which is indicative of a damaged control valve or a flow of gas through the shutoff device in excess of normal operating levels, to shift the valve spool to a closed or flow-blocking position.

Further, means may be provided to safely withdraw the compressed gas from a cylinder in which the high-pressure control valve has been sheared off, having an auxiliary flow control device adapted for attachment to standard gas cylinders.

This comparatively simple and inexpensive automatic shutoff device may be easily incorporated into the inlet end of most control valve designs and with minimum modifications to the valve body, this safety device may be adapted to existing control valves. No changes are required in the compressed gas cylinders.

Accordingly it may be seen that a principal advantage of this invention provides for the blockage of escaping gas through a damaged control valve of a compressed gas cylinder by a fail-safe shutoff device, incorporated into the control valve.

Another advantage of this invention provides for the detection of a damaged control valve of a compressed gas cylinder and activating a shutoff device to prevent gas from escaping from the cylinder.

Still another advantage of this invention is to detect the excessive flow of gas from a compressed gas cylinder and thereupon activate a shutoff device to block the flow of gas from the cylinder.

Yet another advantage of this invention is to provide a fail-safe shutoff device to block an uncontrolled flow of gas through a damaged control valve of a compressed gas cylinder which may be incorporated into gas cylinder units now in service.

Many other advantages, features and additional objects of the present invention will become apparent to those skilled in the art upon making reference to the following description and the accompanying drawings in which several embodiments incorporating the principles of the present invention are shown by way of illustrative example.

BRIEF DESCRIPTION OF THE DRAWINGS

FIG. 5 is a fragmentary sectional view similar to FIG. 2, but showing another embodiment of the invention;

FIG. 6 is a fragmentary sectional view of yet another embodiment of the invention;

FIG. 7 is a sectional view taken along the line VII—VII of FIG. 6;

FIG. 8 is a fragmentary sectional view similar to FIG. 6, but showing still another embodiment of the invention;

FIG. 9 is an enlarged view through the fracture zone of the control valve showing how deformation activates the abutment release of the pin stop;

FIG. 10 is a fragmentary sectional view similar to FIG. 8, but showing yet another embodiment of the invention;

FIG. 11 is a sectional view taken along the line XI—XI of FIG. 10;

DETAILED DESCRIPTION

Figure 1:
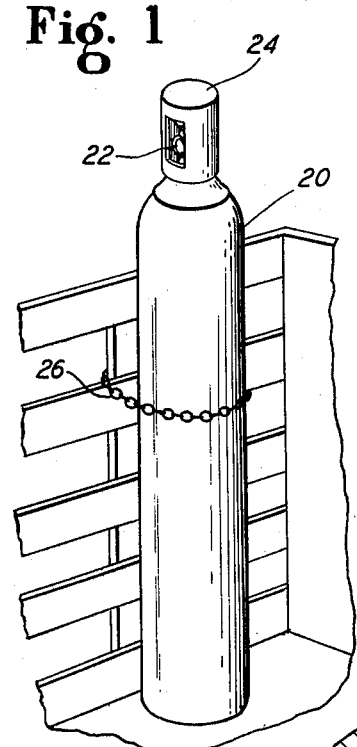
FIG. 1 is a view in perspective of a compressed gas cylinder making utilization of the present invention.

Referring to the drawings, in FIG. 1 there is shown a gas cylinder 20, equipped with a high-pressure control valve 22 and a valve-protector-cap 24. Certain gases are generally shipped compressed in these tough, seamless steel cylinders, as for example, oxygen, which finds wide use in many industries, in construction and hospitals today. Oxygen cylinders are generally charged to a pressure of approximately 140 kilograms per square centimeter at 21° C. (2,000 pounds per square inch at 70° F.). Other gases may also be compressed to an equally high pressure.

Since these highly compressed gases represent a significant hazard to those in the area of such cylinders 20, great care must be exercised to protect these cylinders against damage, especially the more vulnerable valves 22. The valve-protector-cap 24 affords good protection during shipping and storage with a chain 26 provided to prevent upset. However, when the cylinder 20 is placed in use, the valve cap 24 must be removed to gain access to the valve 22. Accordingly, the cylinder 20 is now afforded the least protection at a time when people are most exposed to its dangers.

The high-pressure control valve 22 includes a valve body 28 having a threaded portion 30 turned into a threaded opening 32 in the top of the cylinder 20. An inlet opening 34 is formed in the threaded portion 30 of the valve body 28 and an internally threaded flow outlet opening 36 provided in the valve body 28 for the connection of a pressure regulator or other suitable means 40 as may be required in accordance with the application of gas use.

A passageway 42 provides for flow communication between said inlet opening 34 and said outlet opening 36 with a valve seat 44 interposed between the opening 34 and opening 36. A high-pressure valve mechanism 46 is arranged to close the passage 42 by turning a control handle 48 to bring the valve mechanism 46 into sealing engagement with the valve seat 44. A frangible disk 50 is provided up-stream of the valve mechanism 46 to relieve the cylinder 20 of overpressurization. The above-described construction is somewhat similar to the highpressure control valves presently in service which afford no fail-safe protection against the possibilities of serious damage befalling the control valve.

Figure 2:
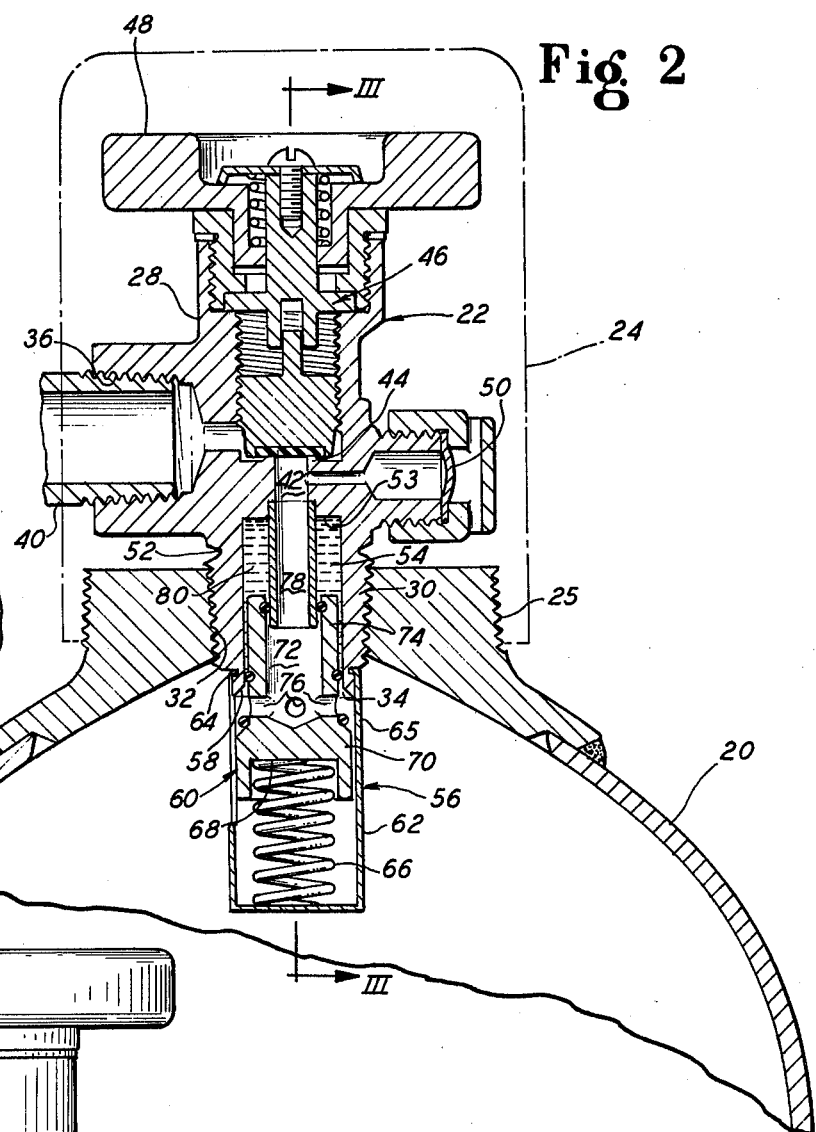
FIG. 2 is an enlarged, fragmentary sectional view of one embodiment of a flow control device constructed in accordance with the principles of the present invention.
Figure 3:
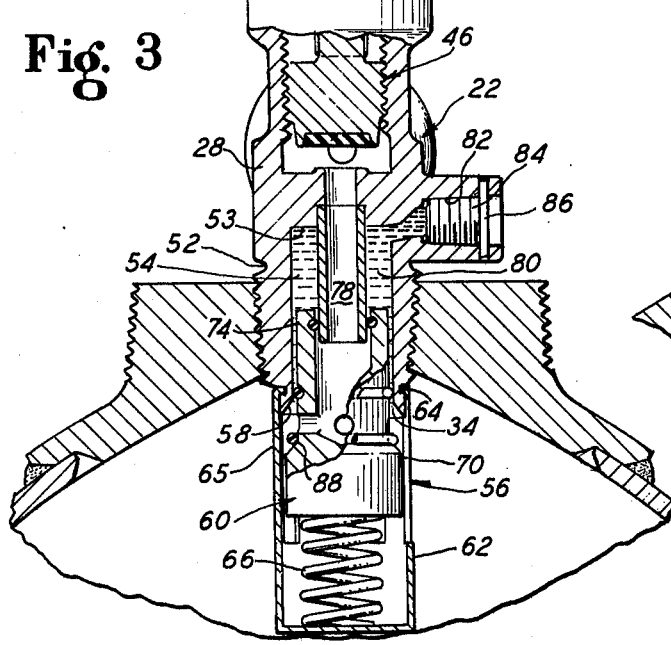
FIG. 3 is a sectional view taken substantially along the line III—III of FIG. 2.
Figure 4:
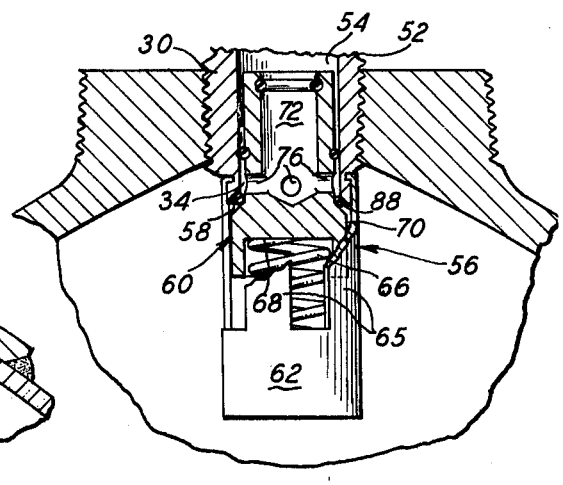
FIG. 4 is a view similar to FIG. 3, but showing the top portion of the control valve sheared off and showing the fail-safe shutoff means in a closed position.

Now, with specific reference to FIGS. 2, 3 and 4, of the drawings showing one embodiment of the invention, the valve body 28 includes a fracture zone 52 adjacent the threaded portion 30 with the inner end 53 of the inlet opening 34 extending into the fracture zone 52 and preferably somewhat beyond, providing a chamber 54. The fracture zone 52 includes a calculated reduced wall thickness surrounding the chamber 54 to provide a controlled location in which breakage of the valve body will most likely occur when the control valve is subjected to destructive encounters.

A fail-safe shutoff means 56 includes a valve seat 58 which is formed about the inlet opening 34 and a valve spool 60 which extends into the inlet opening 34 in sealing engagement therewith.

A cupped hanger 62, secured to the threaded portion 30 of the control valve 22 in a groove 64 by fingers 65 formed integrally therewith, provides a retainer for a spring 66. An upper end of the spring 66 is received in a recess 68 formed in a lower or flow inlet end 70 of the valve spool 60 and arranged to provide an upward force thereagainst.

The shutoff means 56 provides normal flow communication to the control valve 22 by means of a central passage 72, formed in an upper or flow outlet end 74 of the valve spool 60, and a plurality of connecting ports 76 extending radially outwardly from the central passage 72 to the interior of the cylinder 20 adjacent the valve seat 58 at the inlet end 70 of the spool 60.

A tube portion 78, comprising a lower extension of the passageway 42, extends into the opening 34 and downward into telescopic, sealed engagement with the central passage 72 to isolate the upper portion of the inlet opening 34 to define the chamber 54. The chamber 54 provides a sealed pressure chamber associated with the flow outlet end 74 of the valve spool 60. As best seen in FIG. 3, a liquid 80, chosen for its compatibility with the gas utilized in the cylinder, is confined in the pressure chamber 54 and provides a static force against the outlet end 74 of the spool 60. This force holds the valve spool in an open position, relative to the valve seat 58, against the combined forces of the bias of the spring 66 and the fluid pressure force associated with the compressed gas in the cylinder, against the flow inlet end 70 of the spool 60.

Thus, the spool 60 is maintained in a counterpoise state by equal and opposing forces applicable against the opposite ends 70 and 74 of the valve spool 60, wherein the connecting ports 76 remain open to the interior of the cylinder 20.

The valve spool 60 is initially pre-set to an open position by introducing the liquid 80 into the pressure chamber 54 through a connecting threaded loading port 82 formed in the valve body 28. The loading port 82 is placed in an upright position and filled to a predetermined level. Thereafter, a pipe plug 84 is threaded into the loading port 82, forcing the entrapped liquid 80 down into the pressure chamber 54 against the bias of the spring 66. The plug 84 may be retained in position by a drift pin 86 or the like. The control valve 22, including the fail-safe shutoff means 56, is then assembled in the threaded opening 32 of the gas cylinder 20 and the cylinder is charged with gas through the opened control valve 22 and shutoff means 56.

If the upper portion of the high-pressure control valve 22 is sheared off by a destructive impact, as shown in FIG. 4, and the pressure chamber 54 is ruptured, the force-balancing liquid 80 will be lost and the pressure of the compressed gas acting on the flow inlet end 70 will instantaneously slam the valve spool 60 shut against the valve seat 58, thereby closing off the connecting ports 76 from the compressed gas in the cylinder 20. To provide a positive air-tight closure, an "O"

ring 88 may be provided on the valve spool 60 to make contact with the valve seat 58. In the event that only a crack occurs in the valve body at the fracture zone 52, the liquid 80 will quickly spill out of the pressure chamber 54 and also create a force imbalance between opposite ends of the valve spool 60 to cause the valve spool to close with no loss of compressed gas into the ambient air.

FIG. 5 shows an alternate form of the invention having many of its elements identical to those of the embodiment shown in FIGS. 2 and 3. Accordingly, detailed descriptions will not be repeated. Herein, the pressure chamber 54 is in minimum flow communication with the compressed gas in the cylinder 20 by way of a narrow annular metering passage 90 between adjacent walls of the valve spool 60 and the inlet opening 34 of the valve body 28. A spring 94, acting against the flow outlet end 74 of the valve spool 60, provides a balancing force to the spring 66 acting against the inlet end 70 of the spool. Further, with the metering passage 90 providing fluid pressure equalization on opposite ends of the spool, the spool 60 is maintained open in a counterpoise state with normal gas flows from the cylinder 20. However, should a break occur in the fracture zone 52, allowing gas to escape from the pressure chamber 54, wherein the metering passage 90 is unable to pass a sufficient volume of gas to the pressure chamber to replace the lost gas, a pressure imbalance relative to opposite ends of the spool 60 will result. The high pressure in the cylinder acting against the flow inlet end 70 of the spool will quickly close the valve spool 60 against the valve seat 58 to block the gas flow from the cylinder 20.

While this embodiment of the invention may allow small volumes of gas to escape while being activated, it does not require the liquid 80 in the pressure chamber as in the first-described embodiment shown in FIGS. 2 and 3, which may be objectionable in some instances.

FIGS. 6 and 7 show still another embodiment of the invention in which the fail-safe shutoff means 56a includes a valve seat at the lower end of the threaded portion 30 which comprises an "O" ring 88, snugly embracing the valve closure member which in this embodiment comprises a vaned impeller or spin valve 96. The spin valve 96, being threaded at its flow outlet end 74a, is screwed part way into a threaded flow inlet opening 34a of the valve body 28, leaving a plurality of flow passages exposed to the gas in the cylinder 20. The flow passages 98 are defined by a plurality of spaced impeller vanes 100 extending between the threaded outlet end portion 74a and an inlet end disk portion 70a. The vanes are arranged to direct the gas flow from the cylinder to a central passage 72a formed in the spin valve 96 to communicate with the passage 42 of the control valve by way of the chamber 54.

A normal operating velocity of gas flow over the impeller vanes 100 develops insufficient torque on the spin valve 96 to overcome resistive frictional forces of the position-securing "O" ring 88a. However, in the event of a damaged control valve 22, permitting a comparatively high velocity of gas flow to escape from the cylinder 20, the vanes 100 will develop a suitable torque to cause the spin valve to overcome a predetermined static frictional force imposed thereon and turn it to a blocking position.

In this embodiment of the invention, an excessive flow of gas caused by problems other than a damaged control valve body 28 in the area of the fracture zone 52 can effect a blockage of the shutoff means 56a. A frangible disk 50a may be incorporated in the valve closure member, in series flow communication with the passage 42, to protect against overpressurization upon the closing of the spin valve 96.

FIG. 8 provides another embodiment of the invention in which damage to the high pressure control valve 22 is sensed by the deformation of the valve body 28 in the area of the fracture zone 52. Herein, a valve spool 60b, similar to that of the FIG. 5 embodiment, is utilized having a plurality of flow communicating passages 102 formed in the walls thereof providing access to the compressed gas in the cylinder 20 when the shutoff means 56b is in the pre-set open condition. A hemispherically-ended pin extension 104, extending from the flow outlet end 74b of the valve spool 60b, projects upward into the chamber 54 and into abutment with an aligned hemispherically-ended pin stop 106 formed on an abutment member 108, secured in the chamber 54 at the fracture area 52. The abutment member 108 further includes a perforated dished disk 110 from which the stop pin extends. Since both the stop pin 106 and the pin extension 104 have hemispherical ends, which generally reduce the abutment therebetween to a near point contact, even a slight misalignment of the pin stop 106 relative to the pin extension 104 or with a corresponding pressure differential will produce a bending deformity of the dished disk 110 and a displacement of the pin stop 106. As best seen in FIG. 9, a damaged high-pressure control valve 22 causing a deformation of the valve body 28 at the fracture zone 52 also produces the abutment releasing misalignment of the pin stop 106. The misalignment may be as little as 2° to develop a condition of imbalance to close the valve spool 60b against the valve seat 58.

The FIG. 10 embodiment provides a fail-safe shutoff means 56c somewhat similar to FIG. 8 construction, but having a valve spool 60c differing in the abutment means 112 utilized therewith. The abutment means 112 consists of a buckling column or stop pin 114 which is supported by a tube portion 78c secured in the valve body 28 at the fracture zone 52 and abutting the top surface of the valve spool outlet end 74c. The stop pin 114 is proportioned to withstand normal pressure differentials as are likely to occur in the normal course of gas consumption, but will collapse upon encountering a predetermined, substantial pressure differential as applicable to opposite ends of the valve spool 60c. Herein, a sheared or damaged control valve 22, accompanied by a diminished pressure in the pressure chamber 54 and accordingly, a drop in the balancing force applicable against the flow outlet end 74c of the valve spool 60c will cause the stop pin 114 to buckle under the force of the gas pressure applicable against the inlet end 70c of the valve spool 60c by the compressed gas in the cylinder 20. Accordingly, the valve spool will close against the valve seat 58 to quickly halt the flow of escaping gas.

Figure 12:
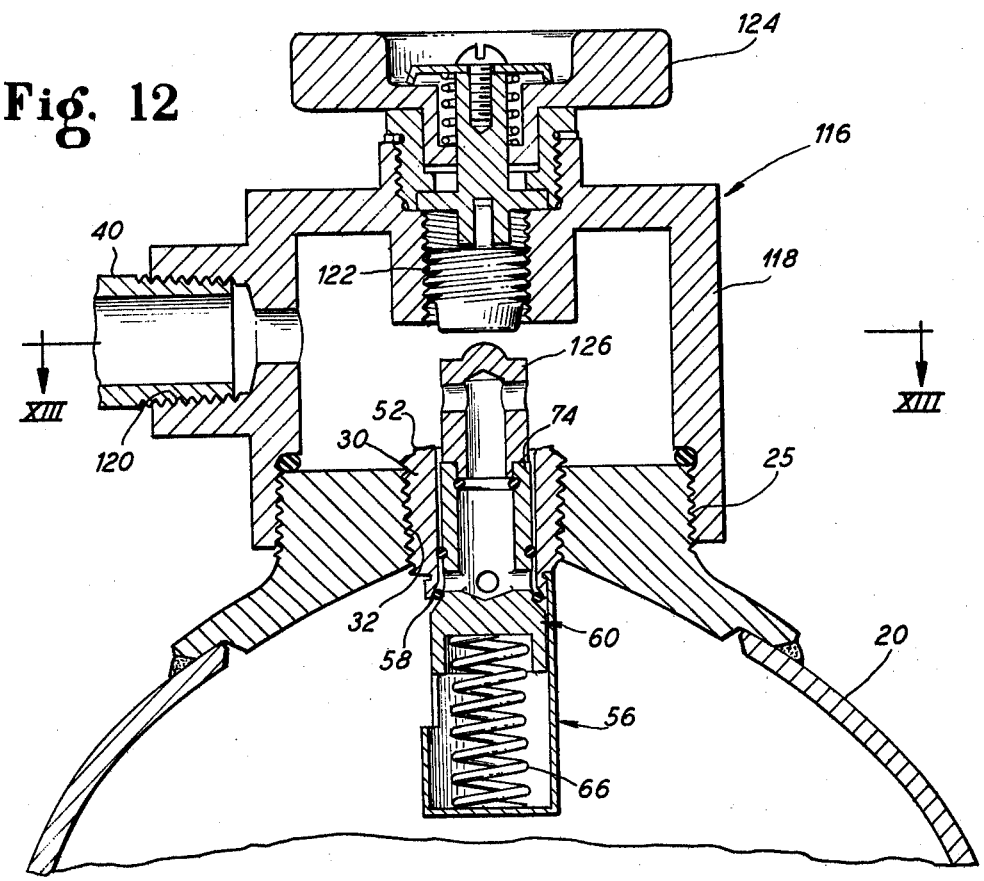
FIG. 12 is a sectional view similar to FIG. 4, but showing a reclaiming means attached to the gas cylinder and being utilized to reopen the valve spool of the shutoff means.
Figure 13:
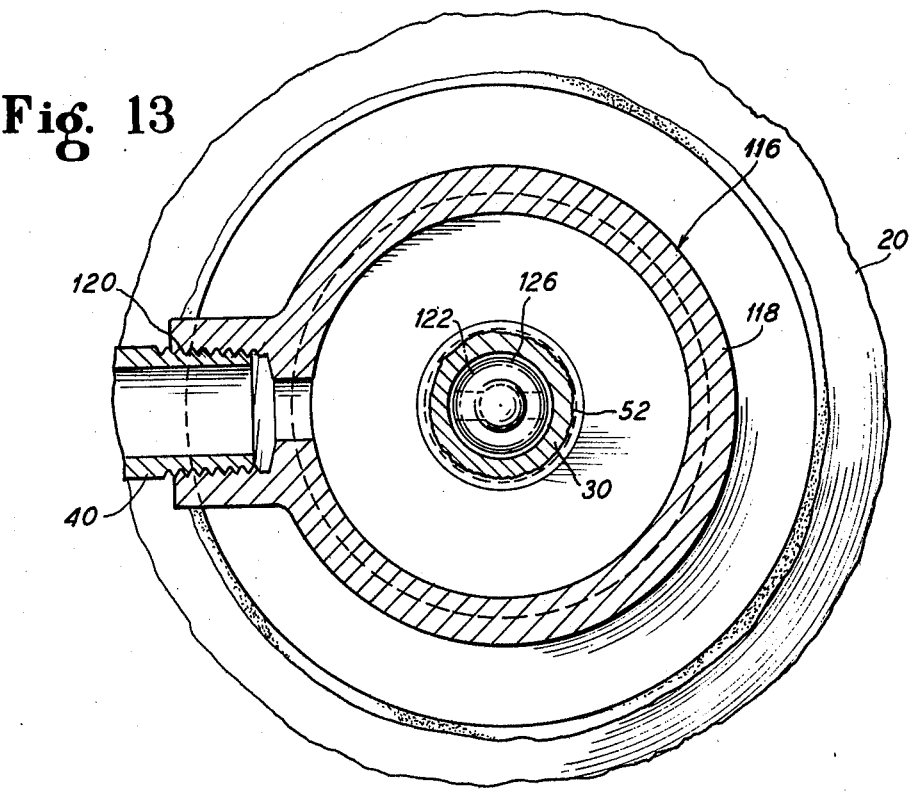
FIG. 13 is a sectional view of the reclaiming means taken along the line XIII—XIII of FIG. 12.

The fail-safe shutoff means 56, as disclosed in most embodiments, provides a means of controlled bleed off or reclaiming the entrapped gas remaining in the cylinder 20 after the shutoff means has been actuated by a destructive encounter by the control valve. As shown in FIGS. 12 and 13, a gas reclaiming means 116 is secured to the gas cylinder 20 utilizing the threads 25 provided for the valve-protector cap 24. The gas reclaiming means 116 includes a sealed chamber 118 having a threaded flow outlet opening 120 for the connection of a pressure regulator or the like 40. A high-pressure valve mechanism 122 and control handle 124 similar to those used with the high-pressure control valve 22 are provided to open the closed valve spool 60 with the aid of an extension tube 126. The extension tube 126 provides a mechanical link between the valve mechanism 122 and the flow outlet end 74 of the valve spool 60 and is constructed for suitable support on the valve spool 60 without blocking the gas flow from the cylinder 20. Thus, the valve spool 60 of the fail-safe shutoff means 56 may be forced open by the reclaiming means against the bias of the spring 66 and against the fluid pressure force of the compressed gas still remaining in the cylinder.

As gas is consumed and the pressure in the cylinder drops, the fail-safe shutoff means in some of the embodiments of this invention may become slightly less responsive to a damaged valve body in the fracture zone. However, this is at a time of lesser danger. The embodiment shown in FIG. 2 will, however, provide generally a more uniform response to a damaged control valve since the pressure of the compressed gas does not communicate with the pressure chamber 54 and therefore, the operation of the shutoff means is not dependent on a differential in gas pressures on opposite ends of the valve closure means.

It may be seen that each of the various embodiments of the invention provides specific advantages and features that may be more effective in protecting against a damaged control valve in a particular compressed gas cylinder application. Further, some of these embodiments may be well-suited to provide a fail-safe shutoff device for flow control means used to dispense pressurized gas in other applications apart from their use with compressed gas cylinders.

Although several embodiments of the invention have been described and defined herein, it is not to be so limited as to preclude other modifications and alterations to be made thereto as may be reasonably and properly included within the scope of the appended claims.

We claim as our invention:

1. A flow control means for a compressed gas cylinder having a high-pressure control valve arranged to control the flow of gas from said cylinder, wherein the improvement comprises:

a fail-safe shutoff means incorporated into the high-pressure control valve and arranged in series flow communication with said control valve and including;

a valve seat formed about an inlet opening of said control valve, a valve spool having an inlet end and an outlet end with a flow communication passage therethrough for flow communication between said cylinder and said control valve and having said outlet end extending partially into the inlet opening to provide an individual fluid pressure chamber adjacent the flow outlet end and being isolated from said flow communication passage, said valve spool being preset to an open position relative to said valve seat permits a normal operative flow of gas to pass through said flow communication passage wherein said pressure chamber provides means to detect a defect in the high pressure control valve associated with predetermined loss of fluid from said pressure chamber and being responsive to such defect to activate said valve spool to move it from the open position to a closed position relative to said valve seat to block gas flow through the shutoff means.

2. The flow control means according to claim 1, wherein said flow inlet end and said flow outlet end of the valve spool each have a balanced opposing force applicable thereagainst to place the valve spool in a counterpoise condition to maintain the valve spool in the preset open position during normal operating conditions and whereby a damaged high pressure control valve, associated with a loss of fluid from said pressure chamber, is effective to upset the counterpoise condition and block gas flow through the shutoff means.

3. The flow control means according to claim 2, wherein said balanced opposing force, applicable against each end of the valve spool, comprises a generally equalized fluid pressure force wherein a damaged control valve, associated with a loss of fluid from said pressure chamber, produces a pressure differential relative to opposite ends of the valve spool to upset the counterpoise condition of the valve spool, causing it to move to the closed position.

4. The flow control means according to claim 3, wherein the fail-safe shutoff means is incorporated into the high-pressure control valve with the valve seat formed about an inlet opening of the control valve and having the outlet end of said valve spool extending partially into the inlet opening and in sealing relationship therewith to provide a pressure chamber adjacent the flow outlet end of the valve spool, wherein a predetermined volume of fluid contained in said pressure chamber provides static force applicable against the valve spool outlet end to hold open a flow communication passage through said valve spool and between the compressed gas cylinder and the control valve, against the fluid pressure force associated with compressed gas in the cylinder and applicable against the valve spool inlet end, whereby a damaged control valve, allowing fluid to escape from said pressure chamber, produces a pressure drop at the outlet end of the valve spool causing the spool to close against the valve seat to block the flow communication passage.

5. The flow control means according to claim 4, wherein the fluid contained in said pressure chamber comprises a liquid initially introduced into said pressure chamber through a connecting, threaded loading port against the bias of a spring acting against the inlet end of the valve spool, to preset the valve spool in the open position, whereby the cylinder may be charged with compressed gas through the flow communication passage.

6. The flow control means according to claim 5, wherein the liquid is filled into the loading port to a predetermined level whereupon a threaded plug is turned down into the threaded loading port to force the liquid therein into the pressure chamber to preset the valve spool to the open position for charging the cylinder with gas.

7. The flow control means according to claim 3, wherein the outlet end of said valve spool extending partially into the inlet opening is in minimal radial spaced relationship therewith to provide the fluid pressure chamber with a predetermined limited rate of gas flow between said cylinder and said pressure chamber whereby the generally equalized fluid pressure force is made applicable against each end of the valve spool to hold open the flow communication passage through said valve spool and between the compressed gas cylinder and the control valve and whereby a damaged control valve, allowing gas to escape from said pressure chamber and produce a predetermined pressure drop at the outlet end of the valve spool, will cause the spool to close against the valve seat to block the flow communication passage.

8. The flow control means according to claim 7, wherein the valve spool is preset to the open position by a pair of generally balanced springs, one acting against each of the spool ends, whereby the cylinder may be charged with compressed gas through the flow communication passage.

9. The flow control means according to claim 3, wherein a predetermined volume of fluid in said pressure chamber provides the fluid pressure force applicable against the valve spool outlet end to hold open the flow communication passage through said valve spool and between the compressed gas cylinder and the control valve, against the fluid pressure force associated with compressed gas in the cylinder and applicable against the valve spool inlet end, whereby a damaged control valve, allowing fluid to escape from said pressure chamber, produces a pressure drop at the outlet end of the valve spool causing the spool to close against the valve seat to block the flow communication passage.

10. A flow control means for compressed gas cylinders having a highpressure control valve arranged to control the flow of gas from a cylinder, said control valve including a valve body having a flow inlet opening and a flow outlet passage therein, wherein the improvement comprises:
a fail-safe shutoff means arranged in series flow communication with said control valve and including:
a valve seat and a complementary valve closure member said valve closure member having an inlet end and an outlet end and being preset to an open position relative to said valve seat and held open by balanced opposing forces applicable against said inlet and outlet ends to place the valve closure member in a counterpoise condition; and
means to detect a defect in the high-pressure control valve, associated with an uncontrolled flow of gas from said control valve, said defect detecting means including a pressure chamber having a volume of fluid therein effective against the outlet end to hold the valve closure member open against gas pressure in the cylinder, effective against the inlet end, said pressure chamber is effectively isolated from said valve body outlet passage and said cylinder to permit a pressure drop in said pressure chamber responsive to only a small predetermined loss of fluid from the pressure chamber wherein said small predetermined fluid loss from said pressure chamber, associated with a damaged control valve is effective to upset the counterpoise condition of the valve closure member causing it to move to a closed position relative to said valve seat and block gas flow from said cylinder.

11. The flow control means according to claim 10 wherein an annular reduced wall thickness surrounding the pressure chamber comprises a fracture zone wherein damage to the control valve is most likely to occur.

12. A flow control means for compressed gas cylinders having a high-pressure control valve arranged to control the flow of gas from a cylinder, said control valve including a valve body having a flow inlet opening and a flow outlet passage therein, wherein the improvement comprises:
a fail-safe shutoff means arranged in series flow communication with said control valve and including:
a valve seat and a complementary valve closure member said valve closure member having an inlet end and an outlet end and being preset to an open position relative to said valve seat and held open by balanced opposing forces applicable against said inlet and outlet ends to place the valve closure member in a counterpoise condition; and
means to detect a defect in the high-pressure control valve, associated with an uncontrolled flow of gas from said control valve, said defect detecting means including a pressure chamber having a volume of fluid therein effective against the outlet end of hold the valve closure member open against gas pressure in the cylinder, effective against the inlet end, the fail safe shutoff means is incorporated into a high-pressure control valve with the valve seat formed about an inlet opening of the control valve and having the outlet end of said valve closure member extending partially into the inlet opening and in minimal radial spaced relationship therewith to effectively isolate the pressure chamber from said cylinder while establishing a generally equalized pressure force applicable against the outlet end of said valve closure member and having the outlet passage of the high-pressure control valve connected in sealing relationship with a flow communication passage through said closure member to separate the pressure chamber from said outlet passage, wherein a damaged control valve, allowing fluid to escape from said pressure chamber and produce a predetermined pressure drop at the outlet end of the closure member will cause the closure member to close against the valve seat to block the flow communication passage.

* * * * *

UNITED STATES PATENT AND TRADEMARK OFFICE
CERTIFICATE OF CORRECTION

PATENT NO. : 4,077,422
DATED : March 7, 1978
INVENTOR(S) : Robie G. Brinkley and Gerry D. Welton It is certified that error appears in the above–identified patent and that said Letters Patent are hereby corrected as shown below:

Column 1, line 33, cancel "trusted" and insert --treated--.

Column 10, line 31, cancel "of" and insert --to--.

Column 10, line 34, cancel "a" and insert --the--.

Signed and Sealed this

Eleventh Day of September 1979

[SEAL]

Attest:

*Attesting Officer*

LUTRELLE F. PARKER
*Acting Commissioner of Patents and Trademarks*